United States Patent [19]

Sakai et al.

[11] Patent Number: 5,164,887
[45] Date of Patent: Nov. 17, 1992

[54] POCKET SIZE ELECTRONIC DEVICE HAVING X- AND Y-DRIVERS SEPARATELY ARRANGED IN COVER AND BODY

[75] Inventors: Tomoki Sakai, Saitama; Minoru Hayashi, Tokyo, both of Japan

[73] Assignee: Citizen Watch Co., Ltd., Tokyo, Japan

[21] Appl. No.: 753,328

[22] Filed: Aug. 30, 1991

[30] Foreign Application Priority Data

Sep. 3, 1990 [JP] Japan .................................. 2-232805

[51] Int. Cl.$^5$ .......................... H05K 5/02; G06F 1/00; G09G 3/00
[52] U.S. Cl. .................................. 361/392; 361/380; 364/708; 340/700
[58] Field of Search ............ 340/700, 784; 273/85 G, 273/148 B; 364/705.02, 705.06, 708; 235/1 D; 361/380, 392, 393, 394, 395, 399, 415

[56] References Cited

U.S. PATENT DOCUMENTS

| | | | |
|---|---|---|---|
| 4,517,660 | 5/1985 | Fushimoto et al. | 364/708 |
| 4,703,160 | 10/1987 | Narishima et al. | 364/708 X |
| 4,842,531 | 6/1989 | Takemura | 364/708 X |
| 4,847,798 | 7/1989 | Kurashima | 364/708 |
| 4,939,514 | 7/1990 | Miyazaki | 364/708 X |
| 4,939,792 | 7/1990 | Urbish et al. | 361/415 X |
| 4,961,126 | 10/1990 | Suzuki | 361/380 X |
| 4,996,522 | 2/1991 | Sunano | 361/395 X |
| 5,039,846 | 8/1991 | Komaki | 235/1 D |

FOREIGN PATENT DOCUMENTS

| | | |
|---|---|---|
| 59-70238 | 5/1984 | Japan . |
| 61-192356 | 11/1986 | Japan . |
| 62-125961 | 8/1987 | Japan . |
| 2-58848 | 4/1990 | Japan . |

OTHER PUBLICATIONS

"Mechanical Design of the HP-18C and HP-28C Handheld Calculators", Layman et al., Hewlett-Packard Journal, vol. 38, No. 8, Aug. 1987, pp. 17-20.
"A Multichip Hybrid Printer Circuit Board for Advanced Handheld Calculators", Hauge et al., Hewlett-Packard Journal, vol. 38, No. 8, Aug. 1987, pp. 25-30.
"Electronic Design of an Advanced Technical Handheld Calculator", Brown et al., Hewlett-Packard Journal, vol. 38, No. 8, Aug. 1987, pp. 34-39.

Primary Examiner—Leo P. Picard
Assistant Examiner—Michael W. Phillips
Attorney, Agent, or Firm—Koda and Androlia

[57] ABSTRACT

A pocket size personal organizer including a CPU for carrying out a data processing operation, an LCD cell for displaying the operation result of the CPU and X- and Y-drivers for driving the LCD cell. The electronic device is separated into a body member and a cover member which are collapsibly connected to each other. The CPU and one of the drivers are arranged in the body member, and the LCD cell and the other driver are arranged in the cover member. An electrical connection between the parts is carried out by heat seal connectors arranged at a hinge bridge portion.

6 Claims, 3 Drawing Sheets

POCKET SIZE ELECTRONIC DEVICE HAVING X- AND Y-DRIVERS SEPARATELY ARRANGED IN COVER AND BODY

BACKGROUND OF THE INVENTION i) Field of the Invention:

The present invention relates to a pocketable small electronic device, and more particularly to a new arrangement of boards and a display in a pocketable small electronic device having a computing function and a display function for use in an electronic pocketbook or the like.

ii) Description of the Related Arts:

In a conventional pocketable small electronic device known as an electronic pocketbook or the like, a keyboard as an input device, a CPU for carrying out a computing processing, a memory and an LCD (liquid-crystal display) cell as an output device are included, and functions such as a schedule management, an address note or an electronic dictionary and the like are portably miniaturized. Such an electronic device portable in a bag or a pocket has become remarkably popular.

Reduction of size and weight of such an electronic device is strongly desired for the convenience of portability, and a variety of constructions for the electronic device have been proposed.

Nowadays, a pocketable small electronic device of this kind usually comprises a body member and a cover member which are collapsibly coupled with each other. On using the electronic device, the cover member of the folding pocketable small electronic device is opened to expose an LCD cell, a keyboard and the like, and, in turn, on carrying, the cover member is folded onto the body member to close it. As a result, errors in the operation of the electronic device can be prevented, and a readily pocketable structure of the same can be provided.

However, in the conventional collapsible pocketable small electronic device, there is a limit in reducing its thickness, and it is difficult to realize an extremely thin thickness of the electronic device so that it can be contained within a pocket of a shirt or the like.

As to the preventing factors against the reduction of the thickness of the electronic device, it can be given that an LCD cell and a driver therefor are usually arranged in an overlapped fashion within the cover member. That is, the overlapped arrangement of the LCD cell and its driver one on another causes the limit in reducing the thickness of the electronic device.

The layered structure of an LCD cell and an LCD cell driver of the cover in the prior art causes a limiting factor when making a thin electronic device.

SUMMARY OF THE INVENTION

It is therefore an object of the present invention to provide a pocketable small electronic device in view of the problems of the prior art, which is capable of extremely miniaturizing the electronic device and extremely readily carrying out a wiring processing in assembling the electronic device.

In accordance with one aspect of the present invention, there is provided a pocketable electronic device, comprising a main body member, a cover member collapsibly connected to the main body member by a hinge portion, a CPU arranged in the main body member for carrying out a data processing operation, an LCD cell arranged in the cover member for displaying a result of the data processing operation of the CPU, X- and Y-drivers separately arranged in the main body member and the cover member for supplying display drive signals separated in X- and Y-directions to the LCD cell which is arranged in parallel with one of the X- and Y-drivers in a flat plane in the cover member, and heat seal connector means arranged in a hinge bridge portion for carrying out an electrical connection among the CPU, the LCD cell and the X- and Y-drivers.

In a preferred embodiment of the pocketable electronic device, the CPU, the LCD cell and the X- and Y-drivers are arranged so that the CPU and the LCD cell are arranged in the diagonal positions and the X- and Y-drivers are also arranged in the diagonal positions.

When the cover member is opened away from the main body member in a flat plane, the CPU, the LCD cell and the X- and Y-drivers are arranged in approximately vertexes of a rectangle, and an electrical connection of the adjacent two parts of the CPU, the LCD cell and the X- and Y-drivers is carried out in a two-dimensional manner along approximately direct lines.

In another preferred embodiment of the pocketable electronic device, the CPU and the X-driver for driving segment electrodes of the LCD cell are arranged in the main body member, and the LCD cell and the Y-driver for driving common electrodes of the LCD cell are arranged in the cover member.

The heat seal connector means in a cover member side is held to the cover member by a part of an LCD retainer for retaining the LCD cell to the cover member. The heat seal connector means in a main body member side is held to the main body member by a heat seal retainer, and the heat seal retainer includes a projection member to be projected under a bottom end of a circuit board and to be held by the circuit board.

In the prior art, an LCD cell and an LCD cell driver must be layered, because X- and Y-drivers which are necessary to drive the LCD cell are installed on a plate and the LCD driver would occupy a large area. To prevent this, two drivers X- and Y- are placed separately, namely, the X-driver is installed on a cover member and the Y-driver on the body member.

As a result, the present invention enables the insulation of at least the CPU for data processing, X- and Y-drivers for supplying drive signals to the LCD cell after receiving the directions from the CPU, and the LCD cell to be carried out such that they are all placed in parallel in the flat plane, so that the device becomes thinner.

BRIEF DESCRIPTION OF THE DRAWINGS

The above and other objects, features and advantages of the present invention will more fully appear from the following description of the preferred embodiment with reference to the accompanying drawings, in which.

DESCRIPTION OF THE PREFERRED EMBODIMENT

Figure 1:
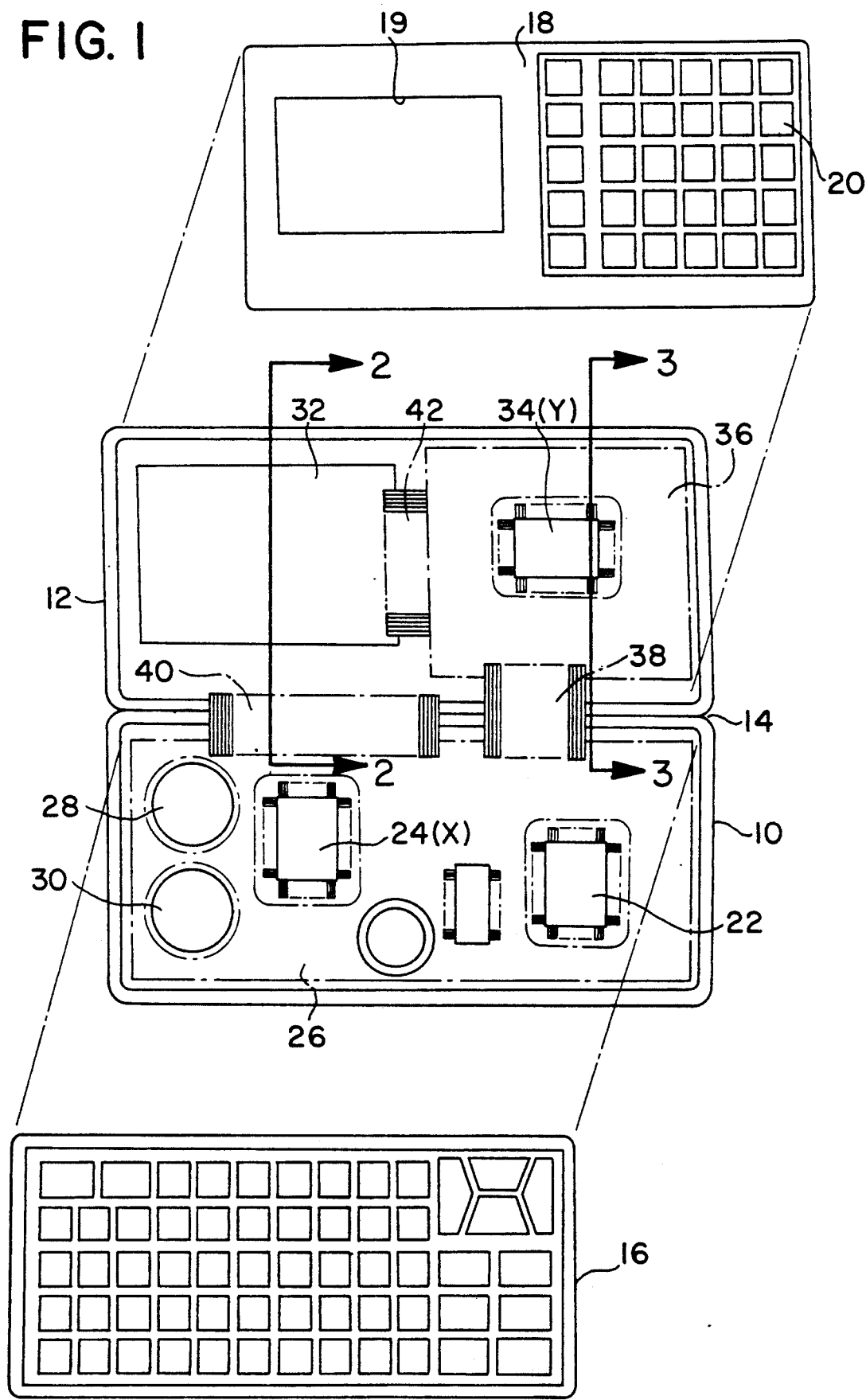
FIG. 1 is an exploded elevational view of one embodiment of a pocketable small electronic device applied to an electronic pocketbook according to the present invention.

Referring now to the drawings, wherein like reference characters designate like or corresponding parts throughout the several views and thus the repeated description thereof can be omitted for brevity, there is shown in FIG. 1 one embodiment of a pocketable small electronic device applied to an electronic pocketbook according to the present invention.

In the drawing, the electronic device comprises a main body member 10 and a cover member 12 which are collapsibly connected to each other by a hinge portion 14. A keyboard 16 and a front panel 18 are detachably mounted to the body member 10 and the cover member 12, respectively. The front panel 18 is formed with a window 19 and a numerical key pad 20.

In FIG. 1, the keyboard 16 and the front panel 18 are detached from the body member 10 and the cover member 12, and parts thereof are exposed.

In this embodiment, in the body member 10, a CPU (central processing unit) 22 for carrying out a data processing operation and an X-driver 24 for driving segment electrodes of an LCD (liquid-crystal display) cell 32 for displaying a result of the data processing operation of the CPU 22 are disposed on a circuit board 26. Two button cells 28 and 30 as a power source for driving the electronic device are detachably mounted to the circuit board 26.

On the other hand, in the cover member 12, the LCD cell 32 is arranged in the left half portion, and a driver board 36 and a Y-driver 34 mounted thereon for driving common electrodes of the LCD cell 32 are arranged in the right half portion. The X- and Y-drivers 24 and 34 supply display drive signals separated in X- and Y- direction to the LCD cell 32.

In this embodiment, as apparent from FIG. 1, although the Y-driver 34 and the numerical key pad 20 are arranged in an overlapped manner, it is readily understood that the Y-driver 34 and the LCD cell 32 are arranged in parallel in a flat plane without three-dimensionally overlapping one on another like a conventional manner, which is distinctive in the present invention.

Therefore, according to the present invention, particularly, the thickness of the cover member 12 can be formed to be extremely thin compared with a conventional cover member, and hence the thin cover member can largely contribute the miniaturization of the electronic device.

In this case, the CPU 22, the X-driver 24, the Y-driver 34 and the LCD cell 32 are mutually electrically connected by heat seal connectors 38, 40 and 42, and, in particular, the heat seal connectors 38 and 40 are arranged as bridges at the hinge portion 14 between the body member 10 and the cover member 12.

As apparently shown in FIG. 1, when the cover member 12 is opened away from the body member 10 in a flat plane, the CPU 22, the X-driver 24, the Y-driver 34 and the LCD cell 32 are arranged in approximately vertexes of a rectangle. The X-driver 24 and the Y-driver 34 are arranged in the diagonal positions, and the LCD cell 32 and the CPU 22 are also arranged in the diagonal positions. The LCD cell 32 and the X- and Y-drivers 24 and 34 to be coupled thereto are positioned so as to be directly connectable via the heat seal connector, and the CPU 22 and the X- and Y-drivers 24 and 34 to be coupled thereto are positioned so as to be directly connectable via the heat seal connector. Hence, the heat seal connection between the LCD cell 32 and the X-and Y-drivers 24 and 34 and between the CPU 22 and the X-and Y-drivers 24 and 34 can be carried out in a two-dimensional manner along approximately direct lines in a flat plane without requiring any conventional three-dimensional coupling cable. Accordingly, it is readily understood that the assembling of the parts and the electrical connection of the same can be extremely readily carried out.

Figure 2:
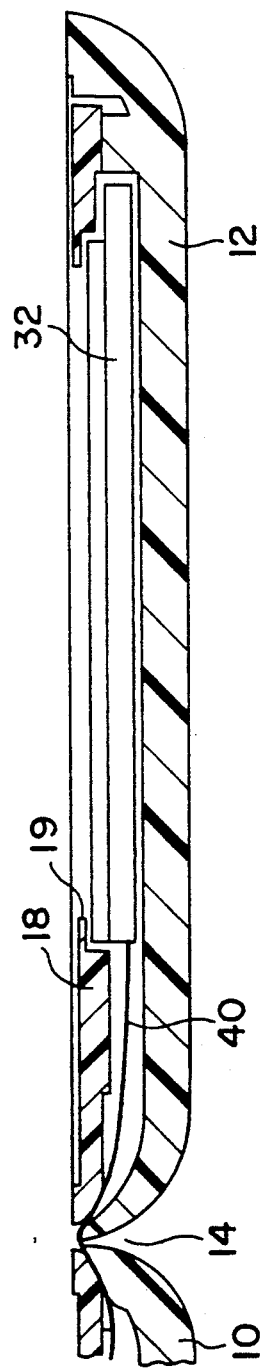
FIG. 2 is a longitudinal cross section along the lines 2—2 of an LCD cell mounted to a cover member of the electronic device shown in FIG. 1.

In FIG. 2, there is shown a cross section of the LCD cell 32 which is securely held by the front panel 18 within the cover member 12 so that a display portion of the LCD cell may be exposed outside through the window 19. Further, the heat seal connector 40 for coupling the LCD cell 32 with the X-driver 24 is positioned and held by the front panel 18 within the cover member 12.

In a conventional electronic device, an LCD cell and X- and Y-drivers are arranged in an overlapped manner within a cover member, and the thickness of the cover member should be designed to be remarkably thick. However, according to the present invention, since the LCD cell 32 and the Y-driver 34 are arranged in parallel in a flat plane within the cover member 12, as shown in FIG. 2, the thickness of the LCD cell portion of the cover member 12 can be remarkably reduced.

Figure 3:
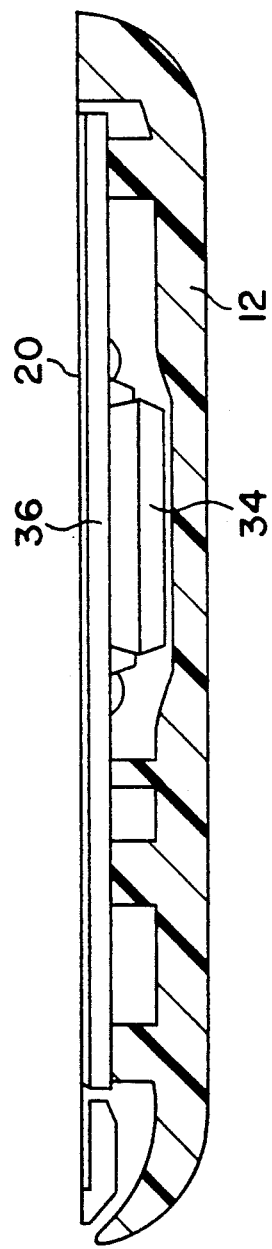
FIG. 3 is a longitudinal cross section along the line 3—3 of a Y-driver mounted to the cover member of the electronic device shown in FIG. 1.

In FIG. 3, there is shown the Y-driver 34 secured onto the central lower surface of the driver board 36 which is held by the front panel 18 within the cover member 12, and the thin numerical key pad 20 is arranged on the driver board 36.

As apparently shown in FIG. 3, according to the present invention, since the Y-driver 34 is arranged within the cover member 12 separate from the X-driver 24 arranged in the body member 10, the Y-driver 34 is formed in small size, and hence there is no need to arrange the LCD cell 32 and the Y-driver 34 in the overlapped fashion.

As described above, according to the present invention, all essential parts constituting the electronic device are two-dimensionally arranged in a flat plane within the body member 10 and the cover member 12 without arranging any parts in the three-dimensionally overlapped manner, and thus even in the heat seal assembling for carrying out an electrical connection between the parts, all electrical connections can be carried out by two-dimensional flat cables without using any three-dimensional cables. As a result, the reduction of the thickness of the electronic device can be remarkably promoted and improved, and the fabrication cost of the electronic device can be extremely reduced.

Figure 4:
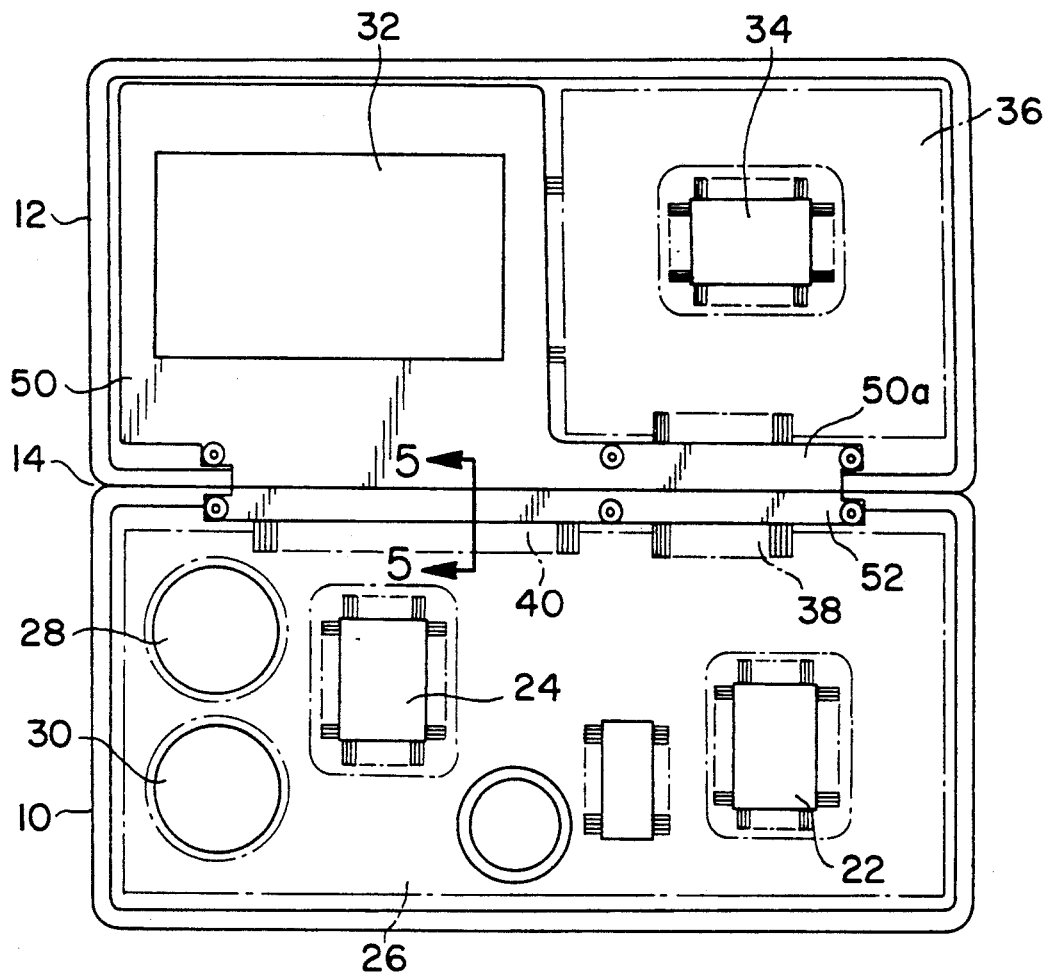
FIG. 4 is an explanatory view of a structure for holding heat seal connectors in a hinge portion according to the present invention.

In FIG. 4, there is shown a structure for firmly retaining the heat seal connectors 38 and 40 at the hinge bridge portion from the surface portion to the internal portion of the electronic device. In the cover member 12, a rectangular part 50a of an LCD retainer 50 for retaining the LCD cell 32 also functions as a heat seal retainer. That is, after the heat seal connectors 38 and 40 are electrically connected, the heat seal connectors 38 and 40 can be securely held within the cover member 12 by mounting the part 50a of the LCD retainer 50 to the cover member 12 by means of screws.

On the other hand, in the body member 10, a rectangular heat seal retainer 52 is used for retaining the heat seal connectors 38 and 40. That is, after the electric connection of the heat seal connectors 38 and 40, the retaining of the heat seal connectors 38 and 40 can be carried out by mounting the heat seal retainer 52 to the body member 10 by using the screws in the same manner as the part 50a of the LCD retainer 50 described above.

In this embodiment, since the length of the heat seal retainer 52 is remarkably long as compared with its width, even when the heat seal retainer 52 is mounted to the body member 10 by using the screws, a part of the heat seal retainer 52 may be floated during the use of the electronic device, and hence the part of the heat seal retainer 52 is held by the circuit board 26.

Figure 5:
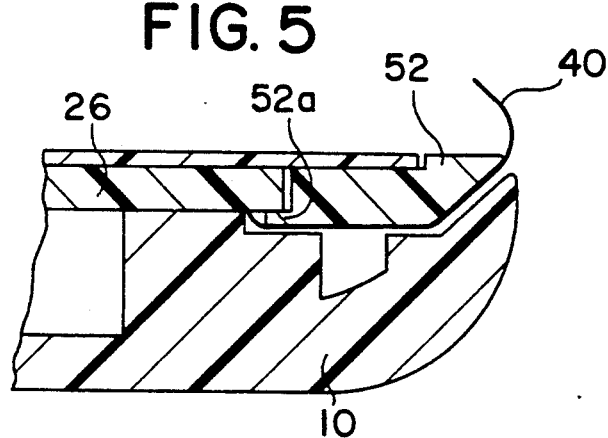
FIG. 5 is a partial longitudinal cross section along the line 5—5 of a heat seal retainer shown in FIG. 4.

In FIG. 5, there is shown a holding structure of such a heat seal retainer 52. The heat seal retainer 52 is provided with a projection portion 52a to be projected under the bottom of the circuit board 26. As shown in FIG. 5, when the heat seal retainer 52 is assembled in the body member 10, the projection portion 52a of the heat seal retainer 52 is slid under the rear surface end of the circuit board 26, and the heat seal retainer 52 is mounted to the body member 10 by using the screws as described above.

Therefore, as apparent from FIG. 5, after the mounting of the heat seal retainer 52 onto the body member 10, the projection portion 52a of the heat seal retainer 52 is firmly fixed by the circuit board 26 along the longitudinal direction of the heat seal retainer 52 to exactly prevent the floating of the heat seal retainer 52 during the use of the electronic device.

In this embodiment, although the Y-driver 34 is arranged within the cover member 12, of course, the X-driver 24 may be arranged within the cover member 12 while the Y-driver 34 is mounted to the body member 10.

As described above, according to the present invention, in a pocketable small electronic device such as an electronic pocketbook or the like, a CPU, an LCD and X- and Y-drivers are all arranged in a two-dimensional manner in a flat plane, and any overlapping arrangement of the parts are removed. As a result, the reduction of the thickness of the electronic device and the miniaturization of the same can be performed. Further, the electrical connection of the parts by the heat seal connectors can be also extremely readily carried out.

Although the present invention has been described in its preferred embodiment with reference to the accompanying drawings, it it readily understood that the present invention is not restricted to the preferred embodiment and that various changes and modifications can be made by those skilled in the art without departing from the spirit and scope of the present invention.

What is claimed is:

1. A pocketable electronic device, comprising:
    a main body member;
    a cover member collapsibly connected to the main body member by a hinge portion;
    a CPU arranged in the main body member for carrying out a data processing operation;
    an LCD cell arranged in the cover member for displaying a result of the data processing operation of the CPU;
    X- and Y- drivers separately arranged in the main body member and the cover member for supplying display drive signals separated in X- and Y-directions to the LCD cell which is arranged in parallel with one of the X- and Y-drivers-drivers in a flat plane in the cover member; and
    heat seal connector means arranged in a hinge bridge portion which electrically connects the CPU, the LCD cell and the X- and Y-drivers.

2. The electronic device of claim 1, wherein the CPU, the LCD cell and the X- and Y-drivers are arranged so that the CPU and the LCD cell are diagonally opposed in the flat plane and the X- and Y-drivers are also diagonally opposed in the flat plane.

3. The electronic device of claim 2, wherein, when the cover member is opened away from the main body member in a flat plane, the CPU, the LCD cell and the X- and Y-drivers are arranged in approximately vertexes of a rectangle, and an electrical connection of the adjacent two parts of the CPU, the LCD cell and the X- and Y-drivers is carried out in a two-dimensional manner along approximately direct lines.

4. The electronic device of claim 1, wherein the CPU and the X-driver for driving segment electrodes of the LCD cell are arranged in the main body member, and the LCD cell and the Y-driver for driving common electrodes of the LCD cell are arranged in the cover member.

5. The electronic device of claim 1, wherein the heat seal connector means in said cover member side is held to the cover member by a part of an LCD which retains the LCD cell to the cover member.

6. The electronic device of claim 1, wherein the heat seal connector means in said main body member side is held to the main body member by a heat seal retainer, and the heat seal retainer includes a projection member which extends under a bottom end of a circuit board and which is held by the circuit board.

* * * * *